United States Patent [19]
Padovani et al.

[11] Patent Number: 5,548,812
[45] Date of Patent: Aug. 20, 1996

[54] METHOD AND APPARATUS FOR BALANCING THE FORWARD LINK HANDOFF BOUNDARY TO THE REVERSE LINK HANDOFF BOUNDARY IN A CELLULAR COMMUNICATION SYSTEM

[75] Inventors: Roberto Padovani, San Diego, Calif.; Lindsay A. Weaver, Jr., Boulder, Colo.; Paul E. Bender, San Diego, Calif.

[73] Assignee: Qualcomm Incorporated, San Diego, Calif.

[21] Appl. No.: 278,347

[22] Filed: Jul. 21, 1994

[51] Int. Cl.[6] .............. H04B 7/26; H04Q 7/22; H04Q 7/36
[52] U.S. Cl. .............. 455/33.2; 455/33.4; 455/56.1; 455/69; 379/59
[58] Field of Search .............. 455/33.1–33.4, 455/56.1, 62, 69, 54.1, 54.2, 63; 379/59, 60, 63

[56] References Cited

U.S. PATENT DOCUMENTS

| | | | |
|---|---|---|---|
| 4,435,840 | 3/1984 | Kojima et al. | 455/33.4 |
| 5,241,685 | 8/1993 | Bodin et al. | 455/33.2 |
| 5,276,907 | 1/1994 | Meidan | 455/33.3 |
| 5,404,576 | 4/1995 | Yahage | 455/56.1 |

FOREIGN PATENT DOCUMENTS 9109673  12/1991  WIPO .............. H04Q 7/00

*Primary Examiner*—Chi H. Pham
*Attorney, Agent, or Firm*—Russell B. Miller; Katherine W. White

[57] ABSTRACT

A method and apparatus for matching the location of the forward link handoff boundary to the reverse link handoff boundary. A system constant is chosen which defines the product of the received power and the transmitted pilot power at every base station. The reverse link power level is measured at the base station and the forward link power level is compensated for the reverse link loading to maintain the constant product. Thereby the forward link handoff boundary to the reverse link handoff boundary are aligned to the same location.

20 Claims, 3 Drawing Sheets

METHOD AND APPARATUS FOR BALANCING THE FORWARD LINK HANDOFF BOUNDARY TO THE REVERSE LINK HANDOFF BOUNDARY IN A CELLULAR COMMUNICATION SYSTEM

BACKGROUND OF THE INVENTION

I. Field of the Invention

The present invention relates to communication systems, particularly to a method and apparatus for performing handoff between two sectors of a common base station.

II. Description of the Related Art

In a code division multiple access (CDMA) cellular telephone system or personal communications system, a common frequency band is used for communication with all base stations in a system. The common frequency band allows simultaneously communication between a mobile unit and more than one base station. Signals occupying the common frequency band are discriminated at the receiving terminal (either within the mobile unit or base station) through the spread spectrum CDMA waveform properties based on the use of high speed pseudonoise (PN) codes and orthogonal Walsh codes. The high speed PN codes and orthogonal Walsh codes are used to modulate signals transmitted from the base stations and the mobile units. Transmitting terminals (either within a mobile unit or within a base station) using different PN codes or PN codes that are offset in time produce signals that can be separately received at the receiving terminal.

In an exemplary CDMA system, each base station transmits a pilot signal having a common PN spreading code that is offset in code phase from the pilot signal of other base stations. During system operation, the mobile unit is provided with a list of code phase offsets corresponding to neighboring base stations surrounding the base station through which communication is established. The mobile unit is equipped with a searching element that allows the mobile unit to track the signal strength of the pilot signal from a group of base stations including the neighboring base stations.

A method and system for providing communication with the mobile unit through more than one base station during the handoff process are disclosed in U.S. Pat. No. 5,267,261 issued Nov. 30, 1993, entitled "MOBILE STATION ASSISTED SOFT HANDOFF IN A CDMA CELLULAR COMMUNICATION SYSTEM," assigned to the assignee of the present invention. Using this system, communication between the mobile unit and the end user is uninterrupted by the eventual handoff from an original base station to a subsequent base station. This type of handoff may be considered as a "soft" handoff in that communication with the subsequent base station is established before communication with the original base station is terminated. When the mobile unit is in communication with two base stations, a single signal for the end user is created from the signals from each base station by a cellular or personal communication system controller.

Mobile unit assisted soft handoff operates based on the pilot signal strength of several sets of base stations as measured by the mobile unit. The Active Set is the set of base stations through which active communication is established. The Neighbor Set is a set of base stations surrounding an active base station comprising base stations that have a high probability of having a pilot signal strength of sufficient level to establish communication. The Candidate Set is a set of base stations having a pilot signal strength of sufficient level to establish communication.

When communications are initially established, a mobile unit communicates through a first base station and the Active Set contains only the first base station. The mobile unit monitors the pilot signal strength of the base stations of the Active Set, the Candidate Set, and the Neighbor Set. When a pilot signal of a base station in the Neighbor Set exceeds a predetermined threshold level, the base station is added to the Candidate Set and removed from the Neighbor Set at the mobile unit. The mobile unit communicates a message to the first base station identifying the new base station. A cellular or personal communication system controller decides whether to establish communication between the new base station and the mobile unit. Should the cellular or personal communication system controller decide to do so, the cellular or personal communication system controller sends a message to the new base station with identifying information about the mobile unit and a command to establish communications therewith. A message is also transmitted to the mobile unit through the first base station. The message identifies a new Active Set that includes the first and the new base stations. The mobile unit searches for the new base station's transmitted information signal and communication is established with the new base station without termination of communication through the first base station. This process can continue with additional base stations.

When the mobile unit is communicating through multiple base stations, it continues to monitor the signal strength of the base stations of the Active Set, the Candidate Set, and the Neighbor Set. Should the signal strength corresponding to a base station of the Active Set drop below a predetermined threshold for a predetermined period of time, the mobile unit generates and transmits a message to report the event. The cellular or personal communication system controller receives this message through at least one of the base stations with which the mobile unit is communicating. The cellular or personal communication system controller may decide to terminate communications through the base station having a weak pilot signal strength.

The cellular or personal communication system controller upon deciding to terminate communications through a base station generates a message identifying a new Active Set of base stations. The new Active Set does not contain the base station through which communication is to be terminated. The base stations through which communication is established send a message to the mobile unit. The cellular or personal communication system controller also communicates information to the base station to terminate communications with the mobile unit. The mobile unit communications are thus routed only through base stations identified in the new Active Set.

Because the mobile unit is communicating with the end user though at least one base station at all times throughout the soft handoff processes, no interruption in communications occurs between the mobile unit and the end user. A soft handoff provides significant benefits in its inherent "make before break" communication over conventional "break before make" techniques employed in other cellular communication systems.

In a cellular or personal communication telephone system, maximizing the capacity of the system in terms of the number of simultaneous telephone calls that can be handled is extremely important. System capacity in a spread spectrum system can be maximized if the transmitter power of each mobile unit is controlled such that each transmitted signal arrives at the base station receiver at the same level. In an actual system, each mobile unit may transmit the minimum signal level that produces a signal-to-noise ratio that allows acceptable data recovery. If a signal transmitted by a mobile unit arrives at the base station receiver at a power level that is too low, the bit-error-rate may be too high to permit high quality communications due to interference from the other mobile units. On the other hand, if the mobile unit transmitted signal is at a power level that is too high when received at the base station, communication with this particular mobile unit is acceptable but this high power signal acts as interference to other mobile units. This interference may adversely affect communications with other mobile units.

Therefore to maximize capacity in an exemplary CDMA spread spectrum system, the transmit power of each mobile unit in communication with a base station is controlled by the base station to produce the same nominal received signal power at the base station. In the ideal case, the total signal power received at the base station is equal to the nominal power received from each mobile unit multiplied by the number of mobile units transmitting within the coverage area of the base station plus the power received at the base station from mobile units in the coverage area of neighboring base stations.

The path loss in the radio channel can be characterized by two separate phenomena: average path loss and fading. The forward link, from the base station to the mobile unit, operates on a different frequency than the reverse link, from the mobile unit to the base station. However because the forward link and reverse link frequencies are within the same frequency band, a significant correlation between the average path loss of the two links exists. On the other hand, fading is an independent phenomenon for the forward link and reverse link and varies as a function of time. However, the characteristics of the fading on the channel are the same for both the forward and reverse link because the frequencies are within the same band. Therefore the average of fading over time of the channel for both links is typically the same.

In an exemplary CDMA system, each mobile unit estimates the path loss of the forward link based on the total power at the input to the mobile unit. The total power is the sum of the power from all base stations operating on the same frequency assignment as perceived by the mobile unit. From the estimate of the average forward link path loss, the mobile unit sets the transmit level of the reverse link signal.

Mobile unit transmit power is also controlled by one or more base stations. Each base station with which the mobile unit is in communication measures the received signal strength from the mobile unit. The measured signal strength is compared to a desired signal strength level for that particular mobile unit at that base station. A power adjustment command is generated by each base station and sent to the mobile unit on the forward link. In response to the base station power adjustment commands, the mobile unit increases or decreases the mobile unit transmit power by a predetermined amount.

When a mobile unit is in communication with more than one base station, power adjustment commands are provided from each base station. The mobile unit acts upon these multiple base station power adjustment commands to avoid transmit power levels that may adversely interfere with other mobile unit communications and yet provide sufficient power to support communication from the mobile unit to at least one of the base stations. This power control mechanism is accomplished by having the mobile unit increase its transmit signal level only if every base station with which the mobile unit is in communication requests an increase in power level. The mobile unit decreases its transmit signal level if any base station with which the mobile unit is in communication requests that the power be decreased. A system for base station and mobile unit power control is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM," issued Oct. 8, 1991, assigned to the assignee of the present invention.

Base station diversity at the mobile unit is an important consideration in the soft handoff process. The power control method described above operates optimally when the mobile unit communicates with each base station through which communication is possible. In doing so, the mobile unit avoids inadvertently interfering with communications through a base station receiving the mobile unit's signal at an excessive level but unable to communicate a power adjustment command to the mobile unit because communication is not established therewith.

Each base station coverage area has two handoff boundaries. A handoff boundary is defined as the physical location between two base stations where the link would perform the same regardless of which of the base stations the mobile unit was in communication with. Each base station has a forward link handoff boundary and a reverse link handoff boundary. The forward link handoff boundary is defined as the location where the mobile unit's receiver would perform the same regardless of which base station it was receiving. The reverse link handoff boundary is defined as the location of the mobile unit where two base station receivers would perform the same with respect to that mobile unit.

Ideally these boundaries should be the balanced meaning that they have the same physical location. If they are not, network capacity may be reduced as the power control process is disturbed or the handoff region unreasonably expands. Note that handoff boundary balance is a function of time in that the reversing link power increases as the number of mobile units increases. An increase reverse power decreases the effective size of the coverage area of the base station and causes the reverse link handoff boundary to move inward toward the base station. Unless a compensation mechanism for the forward link is incorporated in the base station, even a system that is initially perfectly balanced will be unbalanced periodically dependent on the loading.

The present invention is an apparatus and method for compensation of a base station to achieve a balanced handoff boundary condition under varying loading conditions. The balancing of a base station increases and decrease the coverage area of the base station automatically as needed to match the forward link handoff boundary to the reverse link handoff boundary. This process is called base station breathing.

It is therefore the object of the present invention to provide method and apparatus for matching the forward link handoff boundary to the reverse link handoff boundary.

It is another object of the present invention to provide a method and apparatus for continuously monitoring and reacting to the reverse link loading to maximize system capacity.

SUMMARY OF THE INVENTION

The present invention defines a method and apparatus for matching the forward link handoff boundary to the reverse link handoff boundary. The method and apparatus is based on measurement the reverse link power level at the base station and adjustment of the forward link power level to compensate for the reverse link loading.

Each base station in the system is initially calibrated such that the sum of the unloaded receiver path noise and the desired pilot power is equal to some constant. The calibration constant is consistent throughout the system of base stations. As the system becomes loaded (i.e. mobile units begin to communicate with the base stations), a compensation network maintains the constant relationship between the reverse link power received at the base station and the pilot power transmitted from the base station. The loading of a base station effectively moves the reverse link handoff boundary closer in toward the base station. Therefore to imitate the same effect on the forward link, the pilot power is decreased as loading is increased.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Base station diversity at the mobile unit is an important consideration in the soft handoff process. The power control method described above operates optimally when the mobile unit communicates with each base station through which communication is possible. In doing so, the mobile unit avoids inadvertently interfering with communications through a base station receiving the mobile unit's signal at an excessive level but unable to communicate a power adjustment command to the mobile unit because communication is not established therewith.

A typical cellular, wireless local loop, or personal communication system contains some base stations having multiple sectors. A multi-sectored base station comprises multiple independent transmit and receive antennas as well as independent processing circuitry. The present invention applies equally to each sector of a sectorized base station and to single sectored independent base stations. The term base station can be assumed to refer to either a sector of a base station or a single sectored base station.

Each base station has a physical coverage area in which communication with the base station is possible. Each base station coverage area has two handoff boundaries. A handoff boundary is defined as the physical location between two base stations where the link would perform in the same manner regardless of which of the base station a mobile unit at that location was in communication with. Each base station has a forward link handoff boundary and a reverse link handoff boundary. The forward link handoff boundary is defined as the location where the mobile unit's receiver would perform the same regardless of which base station it was receiving. The reverse link handoff boundary is defined as the location of the mobile unit where two base station receivers would perform the same with respect to that mobile unit.

The present invention is described herein based on a system having soft handoff capability. However the invention is equally applicable hard handoff operation.

A handoff boundary is always defined between at least two base stations. For example in FIG. 1A forward link handoff boundary 60 is a function of the power transmitted from base station 10 and from base station 40 as well as interference from other surrounding base stations (not shown) and other inband sources. Reverse link handoff boundary 50 is a function of the power level received at base station 10 and base station 40 from a mobile unit at that location and the power level received at base station 10 and base station 40 from the other mobile units and other inband sources. Note that the power level received at base station 10 and the power level received at base station 40 are somewhat independent in that if base station 10 has a large number of mobile units located within its coverage area and base station 40 has only one mobile unit, the interference for base station 40 will be much less.

Figure 1A:
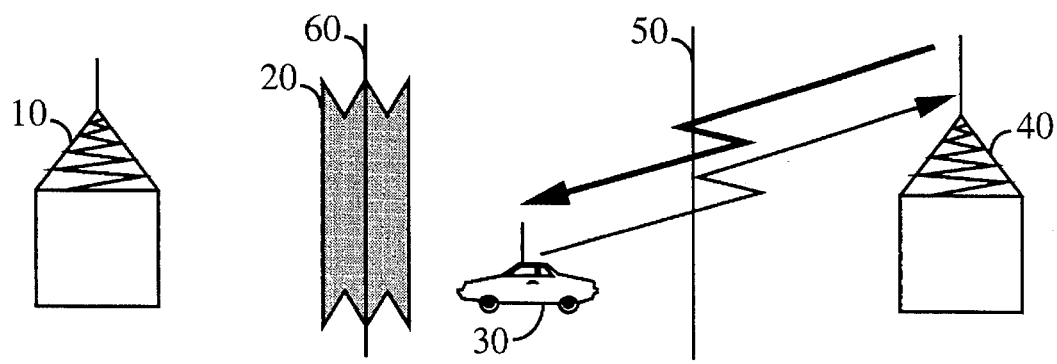
FIGS. 1A–1C show three unbalanced handoff conditions.

Ideally the forward link handoff boundary and the reverse link handoff boundary are co-located so that the optional system capacity may be achieved. If they are not co-located then three situations that are detrimental to capacity can occur. FIG. 1A shows the first of these situations. A soft handoff region is the physical region between two base stations where a mobile unit located within the region is likely to establish communication with both base stations. In FIG. 1A the shaded portion represents soft handoff region 20.

In mobile unit assisted soft handoff, the handoff region is defined by the forward link characteristics. For example, in FIG. 1A soft handoff region 20 represents the region where both the signal quality from base station 10 and the signal quality from base station 40 are sufficient to support communications. When mobile unit 30 enters soft handoff region 20, it will notify which ever base station it is in communication with that the second base station is available for communications. The system controller (not shown) establishes communication between with the second base station and mobile unit 30 as described in above mentioned U.S. Pat. No. 5,267,261. When mobile unit 30 is in soft handoff between base station 10 and base station 40, both base stations control the transmit power from mobile unit 30. Mobile unit 30 decreases its transmit power if either base station requests a decrease and increases its transmit power only if each base station asks for an increase as disclosed in the above mentioned U.S. Pat. No. 5,056,109.

FIG. 1A shows the first situation which is detrimental to system capacity. In FIG. 1A forward link handoff boundary 60 and reverse link handoff boundary 50 are significantly unbalanced (i.e. spaced apart). Mobile unit 30 is located in a position where communication is established only with base station 40. In the region where mobile unit 30 is located, the forward link performance is best with base station 40 but the reverse link performance would be better if mobile unit 30 were communicating with base station 10. In this situation mobile trait 30 is transmitting more power than it would be transmitting if it were in communication with base station 10. The increased transmit power adds unnecessarily to the total interference in the system thereby adversely effecting capacity. It also increases the overall power consumption of mobile unit 30 thereby decreasing its battery life. And it endangers the communication link if mobile unit 30 reaches its maximum transmit power and is unable to respond to commands for increased power.

Figure 1B:
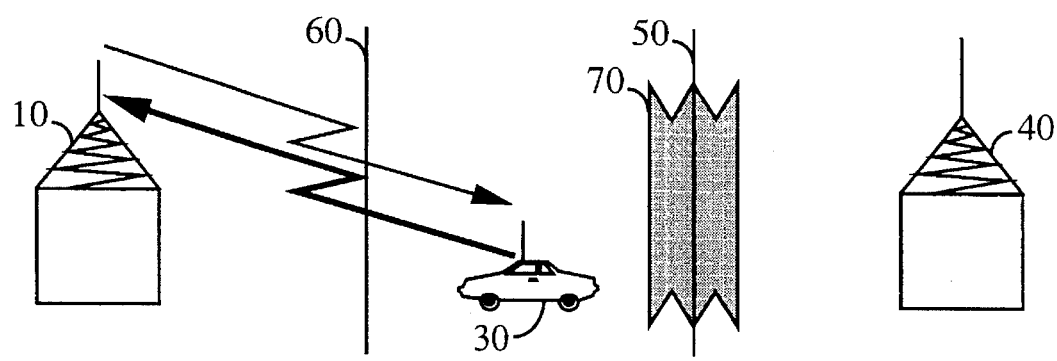

FIG. 1B show an alternative but also detrimental result of an unbalanced handoff condition. In FIG. 1B, soft handoff region 70 is positioned about reverse link handoff boundary 50. This handoff position could be the result of an alternative handoff scheme where handoff is based on the reverse link performance instead of the forward link performance. In one such case, each base station would attempt to measure the power received from each mobile unit. When the measured power level exceeds a threshold or exceeds the level received at other base stations, communication with a second base station is established. In FIG. 1B, mobile unit 30 is located in a region where communication is established only with base station 10. As in FIG. 1A in the region where mobile unit 30 is located, the forward link performance is best with base station 40 but the reverse link performance is best with base station 10. Unlike the reverse link, the forward link does not have a large dynamic range of transmit power and as mobile unit 30 moves toward base station 40, interference from base station 40 increases as the received power level from base station 10 decreases. If the power level from base station 10 falls below a sufficient signal to interference level or below a certain absolute level, the communication link is in danger being of lost. The power level transmitted from base station 10 is slowly increased within a limited dynamic range as mobile unit 30 moves away from base station 10. This increase in power adversely interferes with other users in base station 10 and base station 40 thus unnecessarily decreasing capacity.

Figure 1C:
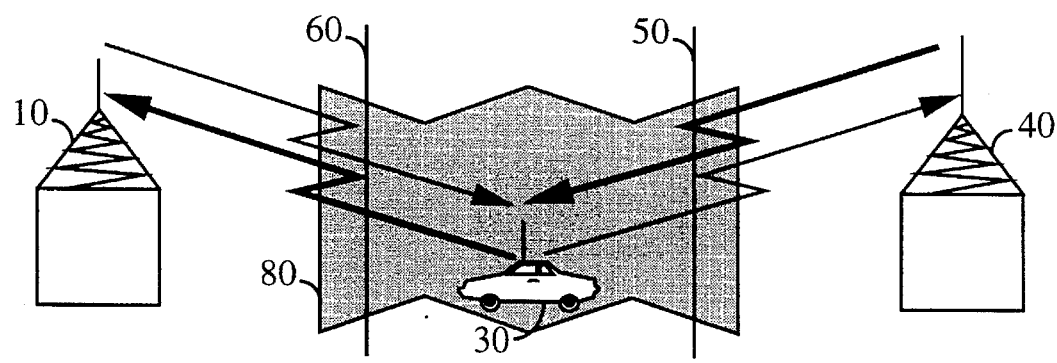

Yet another alternative is a combined handoff scheme based on both the forward link performance and the reverse link performance. FIG. 1C shows one such scenario. In FIG. 1C, handoff region 80 is large and encompasses both reverse link handoff boundary 50 and forward link handoff boundary 60. But unnecessary soft handoff directly decreases the capacity of the system. The purpose of soft handoff is to provide a make before break handoff between base stations and to provide an efficient power control mechanism. However if the soft handoff region is too large, the negative effects become significant. For example, in FIG. 1C, both base station 10 and base station 40 must transmit to mobile unit 30 while mobile unit 30 is in soft handoff region 80. Thus the total system interference is increased while mobile unit 30 is in soft handoff region 80. In addition, resources at both base station 10 and base station 40 must be dedicated to the signal received from mobile unit 30. Therefore increasing the size of the soft handoff region is not an efficient use of the system capacity and resources.

The solution to these adverse effects is to balance (i.e. physically align) the reverse link handoff boundary to the forward link handoff boundary or vice versa. Even if this was done at each base station in a static condition, the balance would be lost as the system was used. For example, the signal to interference level of the reverse link signal received at a base station is a function of the number, location, and transmission power level of the mobile units within its coverage area. As the loading on one base station increases, interference increases and the reverse link handoff boundary shrinks toward the base station. The forward link boundary is not effected in the same manner thus a system that is initially balanced may become unbalanced over time.

To maintain balance, the present invention defines a method "breathing" the size of the base station coverage area. The breathing mechanism effectively moves the forward link handoff boundary to the same location as the reverse link handoff boundary. Both of the boundaries are dependent on the performance of at least two base stations. For breathing to be effective, the reverse link handoff boundary and the forward link handoff boundary must be initially aligned. The boundaries can remain aligned if the performance of each base station is controlled as described below.

The forward link performance can be controlled by the base station. In an exemplary CDMA system, each base station transmits a pilot signal. The mobile units perform handoff based on the perceived pilot signal strength as described above. By changing the power level of the pilot signal transmitted from the base station, the forward link handoff boundary location may be manipulated.

The reverse link performance can also be controlled by the base station. The noise performance of the base station receiver sets the minimum receive power level which can be detected. The noise performance of the receiver is typically defined in terms of an overall system noise figure. By controlling the noise figure of the receiver, such as by injecting noise or adding attenuation, the reverse link performance, and hence the reverse link handoff boundary, may be adjusted.

To balance the handoff boundaries, the performance of each base station must be controlled to be the same as the performance of other base stations in the system. Therefore, we define a system wide performance constant to be used by each base station in the system. A dynamic constant that is equal for every base station but allowed to change over time could also be defined. In the interest of simplicity of design and implementation, a fixed constant is preferred in this embodiment.

The constant is defined in terms of the sum of the receiver path noise in decibels (dB) and the maximum desired pilot signal power in dB as proven below. The best choice constant takes advantage of the performance available from the system. Therefore to define the constant, $K_{level}$, the following equation is used:

$$K_{level} = \underset{\text{all } i}{\text{MAX}} \, [N_{Rx:i} + P_{Max:i}] \qquad \text{Eq. 1}$$

where:

$N_{Rx:i}$ is the receiver path noise of base station i in dB;

$P_{Max:i}$ is the maximum desired pilot signal power of base station i in dB; and MAX all i [] finds the largest such sum of all base stations in a system. Note that once $K_{level}$ is chosen, artificial means can be used to increase the path noise of the unloaded system of each base station to meet the constant.

To prove that setting the sum of the received power and the transmitted power to a $K_{level}$ indeed balances the system, several assumptions are made. The first assumption is that in any base station using multiple redundant receive and transmit antennas, the antennas have been balanced to have the same performance. Also the analyses assumes that the identical decoding performance is available at each base station. It assumes a constant ratio between total forward link power and pilot signal power. And it assumes reciprocity in the forward link path loss and the reverse link path loss.

To find the forward link handoff boundary between two arbitrary base stations, base station A and base station B, start by noting that the forward handoff boundary occurs where the ratio of the pilot signal power of the two base stations to the total power is equal. Assume that mobile unit C is located at the boundary, mathematically in units of linear power (such as Watts):

$$\frac{\text{Pilot Power of } A \text{ Rx'd at } C}{\text{Total Power Received at } C} = \frac{\text{Pilot Power of } B \text{ Rx'd at } C}{\text{Total Power Received at } C} \quad \text{Eq. 2}$$

Noting that the power received at the mobile unit is equal to the power transmitted times the path loss, Equation 2 becomes:

$$\frac{\text{Pilot Power } Tx'd \text{ from } A \times \text{Path loss from } A \text{ to } C}{\text{Total Power Received at } C} = \quad \text{Eq. 3}$$

$$\frac{\text{Pilot Power } Tx'd \text{ from } B \times \text{Path loss from } B \text{ to } C}{\text{Total Power Received at } C}$$

Re-arranging Equation 3 and eliminating the common denominator, yields:

$$\frac{\text{Pilot Power } Tx'd \text{ from } A}{\text{Pilot Power } Tx'd \text{ from } B} = \frac{\text{Path loss from } B \text{ to } C}{\text{Path loss from } A \text{ to } C} \quad \text{Eq. 4}$$

Following the same procedure for the reverse link and noting that the reverse link handoff boundary occurs where each base station perceives the same signal to interference ratio for that mobile unit:

$$\frac{\text{Power of } C \text{ Rx'd at } A}{\text{Total Power Received at } A} = \frac{\text{Power of } C \text{ Rx'd at } B}{\text{Total Power Received at } B} \quad \text{Eq. 5}$$

Noting that the power received at the base station is equal to the power transmitted from the mobile unit times the path loss, Equation 5 becomes:

$$\frac{\text{Power } Tx'd \text{ from } C \times \text{Path loss from } C \text{ to } A}{\text{Total Power Received at } A} = \quad \text{Eq. 6}$$

$$\frac{\text{Power } Tx'd \text{ from } C \times \text{Path loss from } C \text{ to } B}{\text{Total Power Received at } B}$$

Re-arranging Equation 6 and eliminating the common numerator, yields:

$$\frac{\text{Total Power Received at } A}{\text{Total Power Received at } B} = \frac{\text{Path loss from } C \text{ to } A}{\text{Path loss from } C \text{ to } B} \quad \text{Eq. 7}$$

Due to the assumed reciprocity in the forward and reverse link path loss at any location, Equations 4 and 7 may be combined to yield:

$$\frac{\text{Total Power Received at } A}{\text{Total Power Received at } B} = \frac{\text{Pilot Power } Tx'd \text{ from } B}{\text{Pilot Power } Tx'd \text{ from } A} \quad \text{Eq. 8}$$

Changing the units of Equation 8 from linear power to dB yields:

Total Power Received at $A$ (dB) − \hfill Eq. 8'

Total Power Received at $B$ (dB) =

Pilot Power $Tx'd$ from $B$ (dB) − Pilot Power $Tx'd$ from $A$ (dB)

Equation 8' is equivalent to premise set forth in that:
if Total Power Received at A (dB)+Pilot Power Tx'd from A (dB)=$K_{level}$ and Total Power Received at B (dB)+Pilot Power Tx'd from B (dB)=$K_{level}$ then equation 8 will be satisfied.
And the forward link handoff boundary and the reverse link handoff boundary are co-located.

Three mechanisms are needed to perform the breathing function: a means of initially setting performance to $K_{level}$, a means of monitoring the fluctuations in the reverse link, and a means of changing the performance of the forward link in response to the reverse link fluctuations.

One method of initially setting the performance to $K_{level}$ is to set the maximum desired pilot signal strength taking into account the variations over temperature and time and adding attenuation in line with the receiver in a no input signal condition until the $K_{level}$ performance is achieved. Adding attenuation desensitize the receiver and effectively increases the noise figure thereof. This also requires that each mobile unit transmit proportionately more power. The added attenuation should be kept to the minimum dictated by $K_{level}$.

Once initial balance is achieved, the power coming into the base station can be measured to monitor the reverse link performance. Several methods can be used. Measurement can be done by monitoring an AGC (automatic gain control) voltage or by directly measuring the incoming level. This method has the advantage that if an interferer is present (such as an FM signal) this energy will be measured and the handoff boundaries will be drawn closer to the base station. By drawing the handoff boundary closer to the base station, the interferer may be eliminated from the coverage area of the base station and its effect minimized. Measurement could be made by simply counting the number of users communicating through the base station and estimating the total power based on the fact that each mobile unit's signal nominally arrives at the base station at the same signal level.

As the reverse link power increases, the forward link power should be decreased. This can be easily achieved by using an existing AGC circuit within the transmit circuitry or by providing a controllable attenuator in the transmit path.

In the exemplary handoff scheme described above, handoff boundaries are based on the measurement of the pilot signal strength at the mobile unit. An alternative to controlling the total transmit power would be to control only the pilot signal level. To the coverage area designer, this scheme might have a certain sense of appeal but controlling the total transmit power including the traffic (e.g. active calls) and pilot signals together has some advantages. First, the ratio of the pilot signal strength to the traffic channel signal strength remains fixed. The mobile unit may be expecting a fixed ratio and may allocate its resources based on the ratio. If the mobile unit were to receive two equally powerful pilot signals each corresponding to a traffic channel having a different power level, a suboptimal decision on the allocation of mobile unit resources could result. Adjusting the total power is also advantageous because it reduces the interference to other base station coverage areas. If the pilot signal is not strong enough to warrant a handoff in the coverage area of a neighboring base station, the high powered traffic channel signal adds unusable and unnecessary interference to that area. Of course, in some applications, it may be advantageous to combine the methods by controlling the power of the pilot signal in some cases and the total transmit power in other cases. In still another application, it may be advantageous to change the ratio of the pilot power to the traffic channel power.

In an ideal configuration, the breathing mechanism would measure the receive power and change the transmit power proportionately. However, some systems may not use the proportional method and may instead change the transmit level only a fraction of the perceived changed in receive power. For example, if a system was designed in which the estimation of the received power was difficult and inaccurate, the system designers may wish to decrease the sensitivity to the inaccuracy. A change in transmit level which is only a fraction of the change in receive power achieves the desensitization while preventing gross unbalance of the handoff boundaries.

Another alternative changes the transmit level only when the receiver level exceeds a predetermine threshold. This method could be used to primarily deal with interferers. Of course this method may be combined with a system which changes the transmit level only a fraction of the perceived change in receive power.

The breathing mechanism must have a carefully considered time constant. The breathing mechanism may cause mobile unit handoffs. To perform a handoff, the mobile unit must detect the change in power and send a message to the base station. The system controller must make a decision and notify base stations. A message must be sent back to the mobile unit. This process takes time and the breathing process should be slow enough to allow this process to happen smoothly.

The process of breathing will naturally limit itself to prevent the total convergence of the coverage area of the base station due to excess users on the system. The CDMA system has a large and soft limited capacity. The term soft limited capacity refers to the fact that one more user can always be added but at some number of users each additional user effects the communication quality of all the other users. At some greater number of users, each user's communication quality becomes unusable and the entire link is lost to every mobile unit. To prevent the loss of the link, each base station limits the number of mobile units with which it will establish communication. Once that limit has been reached, the system will refuse attempts to establish additional calls, i.e. new call originations are blocked. The limit is a design parameter and is typically set at about 75% of theoretical capacity. This gives some margin to the system and allows the system to accept an emergency call even while in the limited condition. This limit of the total number of mobile units communicating within the coverage area of a single base station naturally limits the maximum received power and therefore limits the breathing process range of operation.

Figure 2A:
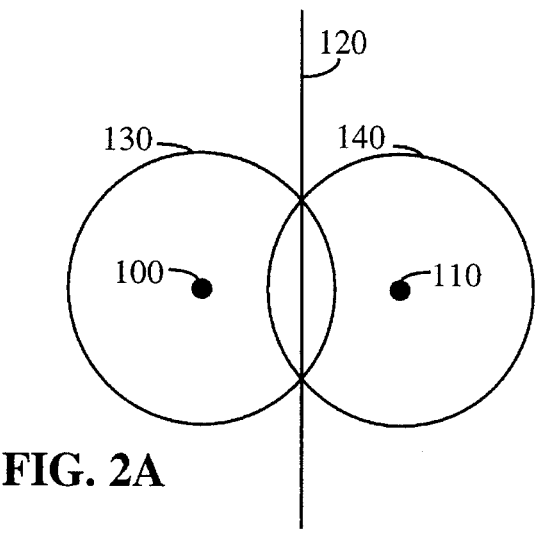
FIGS. 2A–2C illustrate the effect of loading on the handoff boundaries and the effect of the breathing mechanism compensation.
Figure 2B:
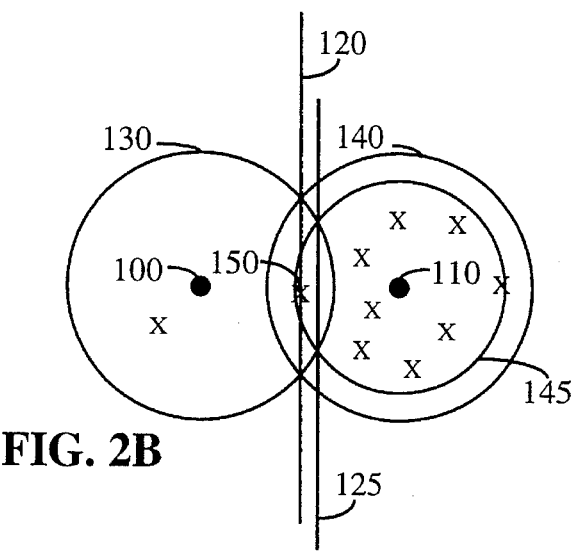
Figure 2C:
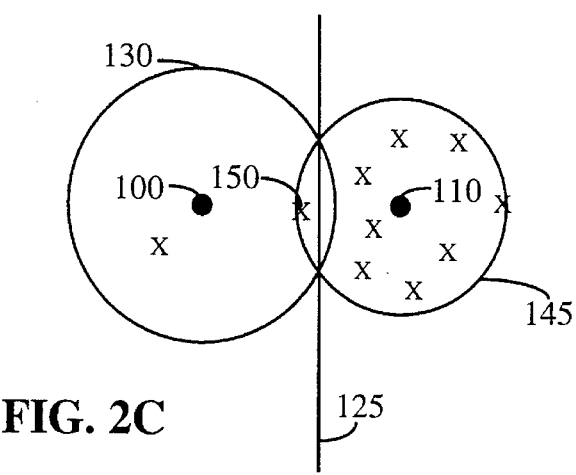

FIGS. 2A–2C illustrate the base station breathing mechanism. In FIG. 2A, base station 100 has circular coverage area 130 in an unloaded condition. The coverage area of base station 100 has been balanced in an unloaded condition and the forward and reverse links coverage areas are aligned with circular coverage area 130. Base station 110 has circular coverage area 140 in an unloaded condition. The coverage area of base station 110 has also been balanced in an unloaded condition and the forward and reverse links coverage areas are aligned with circular coverage area 140. The operation of base stations 100 and 110 have been balanced to $K_{level}$ in an unloaded condition and line 120 represents the location at which operation with each base station is same and hence both handoff boundaries.

In FIG. 2B, base station 110 has be come heavily loaded and base station 100 is lightly loaded. The coverage area of the reverse link has shrunk to the location of circular coverage area 145 while the forward link coverage area remains at circular coverage area 140. The light loading of base station 100 has not effected the coverage area of base station 100 which is still at circular coverage area 130. Note that the reverse link handoff boundary between base station 100 and base station 110 has moved to line 125 while the forward link handoff boundary remains at line 120. Thus the undesirable unbalanced handoff boundary condition has been created.

In FIG. 2C, base station 110 has implemented the base station breathing mechanism. The effect has been to move the forward link handoff boundary to circular coverage area 145. Line 125 now represents both the forward and reverse link handoff boundaries.

In FIGS. 2B and 2C, the X's represent system users. In particular user X 150 is located at the handoff boundary in FIG. 2B. Due to his location, user X 150 is in soft handoff between base station 100 and base station 110. Note that in FIG. 2C, user X 150 is in the same location but due to the shrinkage of base station 110 is now deep into the coverage area of base station 100 and not in the soft handoff region between base station 100 and base station 110. Therefore, the heavily loaded base station 110 has effectively transferred some of its load to the lightly load base station 100.

Figure 3:
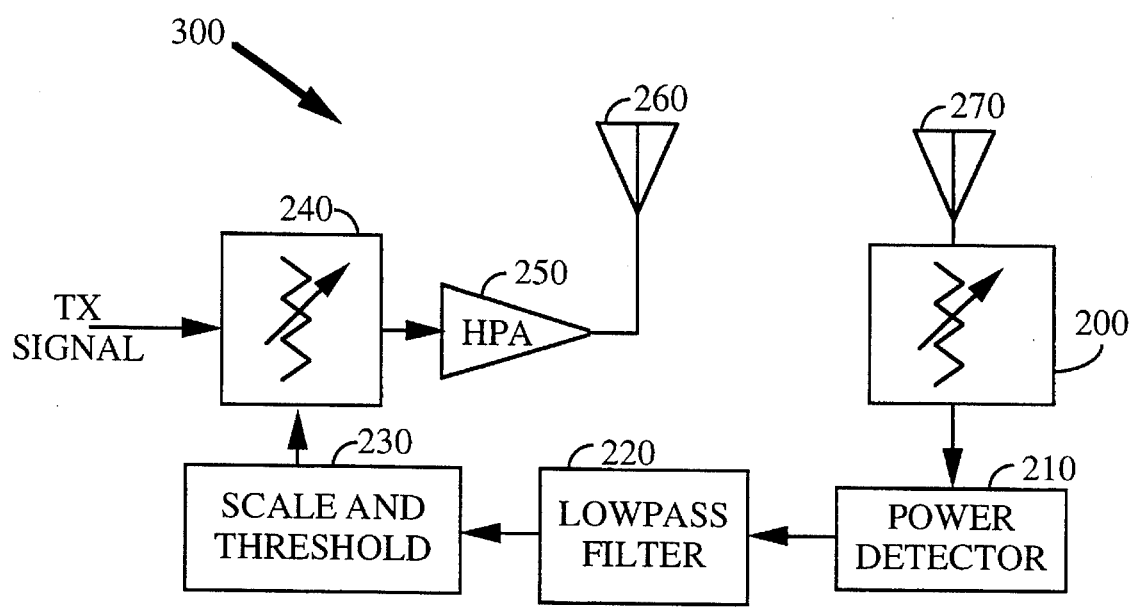
FIG. 3 is a highly simplified block diagram of the breathing mechanism in a base station.

FIG. 3 is a block diagram showing an exemplary base station breathing configuration. Antenna 270 receives signals at base station 300. The receive signals are then passed to variable attenuator 200 which has been used to initially set $K_{level}$ operation. The receive signals are passed to power detector 210. Power detector 210 generates a level indicating the total power in the received signal. Low pass filer 220 averages the power indication and slows the breathing response time. Scale and threshold 230 sets the desired ratio and offset of the relation between increases in the reverse link power and decreases in the forward link power. Scale and threshold 230 outputs a control signal for variable gain device 240. Variable gain device 240 accepts the transmit signal and provides a gain controlled output signal to high power amplifier (HPA) 250. HPA 250 amplifies the transit signal and passes to antenna 260 for transmission over the wireless link.

Many variations to the configuration of FIG. 3 exist. For example, antennas 260 and 270 may each comprise two antennas. Or conversely antennas 260 and 270 may be the same antenna. The power detection in FIG. 3 is based on all incoming signal power within the band of interest. As discussed above, power detection can be based solely on the number of mobile units which have established communication with the base station. Also low pass filer 220 may be a linear filter or nonlinear filter (such as a slew rate limiting filter).

There are many obvious variations to the present invention as presented including simple architectural changes. The previous description of the preferred embodiment is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a system having a plurality of base stations for bi-directional communication with a mobile unit wherein information is communicated to said mobile unit from said plurality of base stations on a forward link and information is communicated to said plurality of base stations from said mobile unit on a reverse link and wherein each base station defines a forward link coverage area and a reverse link coverage area, a method of controlling said base station coverage areas comprising the steps of:

measuring a reverse link power level received at a first base station and at a second base station; and adjusting a forward link power level at said first base station and at said second base station based on said reverse link power level measurement at said first and second base stations to preserve a balance of a location of equivalent forward link performance in relation to a location of equivalent reverse link performance between said first and said second base stations.

2. A method of claim 1 wherein the product of said reverse link power level at said first base station and said forward link power level at said first base station is equal to a constant and the product of said reverse link power level at said second base station and said forward link power level at said second base station is equal to said constant.

3. A method of claim 1 wherein the product of said reverse link power level at said first base station and said forward link power level at said first base station is equal to a constant when said reverse link power level at said first base station is greater than a threshold and the product of said reverse link power level at said second base station and said forward link power level at said second base station is equal to said constant when said reverse link power level at said second base station is greater than said threshold.

4. In a system having a plurality of base stations, each of said plurality of base stations having a corresponding forward link coverage area and a corresponding reverse link coverage area wherein each of said plurality of base stations is for communicating to a mobile unit located within said corresponding forward link coverage area and each of said plurality of base stations is for receiving communication from a mobile unit located within said corresponding reverse link coverage area, a method of aligning a location of a first forward link coverage area to a location of a first reverse link coverage area corresponding to a first base station comprising the steps of:

measuring a level of loading of said reverse link coverage area indicative of said location of said first reverse link coverage area; and changing said location of said first forward link coverage area based on said measured level of loading.

5. The method of aligning of claim 4 wherein said measured level of loading of said reverse link coverage area comprises energy received from a set of mobile units located within said first reverse link coverage area.

6. The method of aligning of claim 5 wherein said level of loading of said reverse link coverage area further comprises energy received from a non system user and a set of mobile units located within a reverse link coverage area corresponding to a second base station.

7. The method of aligning claim 4 wherein said step of changing said location of said first forward link coverage area is limited to a minimum coverage area boundary.

8. The method of aligning claim 4 wherein said step of measuring comprises the step of counting the number of mobile units in communication with said first base station.

9. A method for balancing base station boundaries in a system comprising a plurality of base stations, comprising the steps of:

transmitting a forward link signal at a selected power level from a first base station defining a first forward link coverage area;

receiving a reverse link signal at a first power level at said first base station defining a first reverse link coverage area;

transmitting a forward link signal at a selected power level from a second base station defining a second forward link coverage area, wherein said first forward link coverage area and said second forward link coverage area intersect to define a forward link equality location at which a mobile unit receives communication with the same performance level with said first base station and said second base station; and receiving a reverse link signal at a power level at said second base station defining a second reverse link coverage area, wherein said first reverse link coverage area and said second reverse link coverage area intersect to define a reverse link equality location wherein said first base station and said second base station receive communication from a mobile unit at said reverse link equality location with the same performance level;

wherein said selected power level of said forward link signal from said first base station and said selected power level of said forward link signal from said second base station are selected such that said forward link equality location and said reverse link equality location are the same.

10. The method for balancing base station boundaries of claim 9 further comprising the steps of:

receiving at said first base station said reverse link signal at a second power level higher than said first power level received at said first base station thereby defining a second smaller reverse link coverage area of said first base station and defining a new reverse link equality location; and transmitting from said first base station said forward link signal at a lower power level defining a second forward link coverage area and a new forward link equality location such that said new forward link equality location is the same as said new reverse link equality location.

11. The method for balancing base station boundaries of claim 9 wherein each of said plurality of base stations in said system transmits a pilot signal and wherein said forward link signal from said first base station is said pilot signal corresponding to said first base station.

12. The method for balancing base station boundaries of claim 9 wherein each of said plurality of base stations in said system transmits a pilot signal and message signals and wherein said forward link signal from said first base station is said pilot signal and said message signals corresponding to said first base station.

13. The method for balancing base station boundaries of claim 9 wherein the product of said selected power level of said forward link signal from said first base station and said first power level of said reverse link signal from said first base station is equal to a constant.

14. The method for balancing base station boundaries of claim 13 wherein the product of said selected power level of said forward link signal from said second base station and said power level of said reverse link signal from said second base station is equal to said constant.

15. The method for balancing base station boundaries of claim 13 wherein said constant is dynamic and varies over time.

16. The method for balancing base station boundaries of claim 9 wherein said first power level of said reverse link signal at said first base station comprises an amount of artificial power such that the product of said selected power level of said forward link signal from said first base station and said power level of said reverse link signal from said first base station is equal to a constant.

17. The method for balancing base station boundaries of claim 16 further wherein said power level of said reverse link signal at said second base station comprises an amount of artificial power to such that the product of said power level of said forward link signal from said second base station and said power level of said reverse link signal from said second base station is equal to said constant.

18. An apparatus for controlling a location of a forward link coverage area and a reverse link coverage area of a base station in a system of base stations for bi-directional communication with a set of mobile units comprising:

an antenna system for receiving an incoming signal at a receive power level and for providing a transmit signal at a transmit power level;

a power detector having an input coupled to said antenna system and having an output for providing a power level output indication proportional to said receive power level; and a variable attenuator coupled said output of said power detector for receiving a power control signal and receiving an information signal and providing a power controlled information signal wherein the output of said variable attenuator is coupled to said antenna system thereby setting said transmit power level;

wherein the product of said receive power level of said incoming signal and said transmit power level of said transmit signal is controlled to maintain balance in said location of said forward link coverage area and said reverse link coverage area.

19. The apparatus for controlling the coverage area of a base station of claim 18 further comprising an attenuator disposed between said receive antenna and said power detector for setting said product to a constant when said power level of said incoming signal is minimum.

20. The apparatus for controlling the coverage area of a base station of claim 18 further comprising means of scaling and gating said power level output indication disposed between said power detector and said variable attenuator.

* * * * *